No. 636,596. Patented Nov. 7, 1899.
B. T. WEBBER.
PIE RACK AND CASE.
(Application filed Feb. 11, 1899.)
(No Model.)
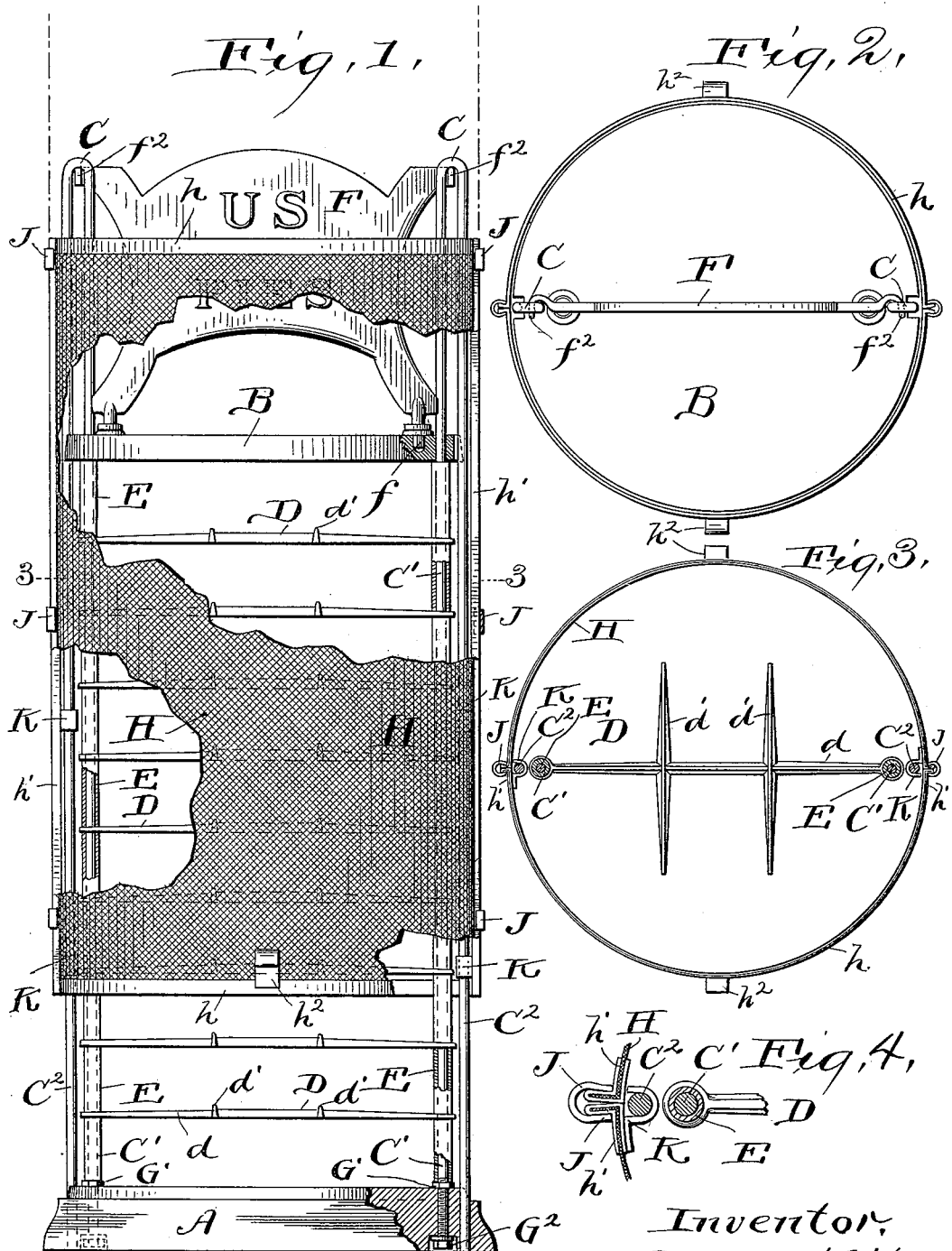

UNITED STATES PATENT OFFICE.

BENTON T. WEBBER, OF CLEVELAND, OHIO.

PIE RACK AND CASE.

SPECIFICATION forming part of Letters Patent No. 636,596, dated November 7, 1899.

Application filed February 11, 1899. Serial No. 705,254. (No model.)

*To all whom it may concern:*

Be it known that I, BENTON T. WEBBER, a citizen of the United States, residing at Cleveland, in the county of Cuyahoga and State of Ohio, have invented a certain new and useful Improvement in Pie Racks and Cases, of which the following is a full, clear, and exact description, reference being had to the accompanying drawings.

One of the objects of my invention is to provide a very simple and efficient rack adapted to support a number of pies or similar articles, which may be of several sizes, the rack being adapted to allow the easy removal of any of them without scraping dirt off the bottom, which would pass onto the article below.

Another object of my invention is to combine with a suitable rack a sliding surrounding screen which is adapted to inclose the rack without materially obstructing the view thereof and may be raised for the removal of articles from the rack.

The invention consists in part of a rack and suitable guides combined with an inclosing screen which may be slid up and down along the guides, in part of the form of shelves I employ, and in part of the arrangement and construction of the screen.

The particular embodiment of my invention shown in the drawings, which is the best form at present known to me, is also of my invention. The invention may therefore be best summarized as consisting of the combination of parts hereinafter described, and definitely specified in the claims.

In the drawings which clearly illustrate my invention, Figure 1 is a side elevation of the pie rack and case with the screen broken away in places to show the interior more clearly. Fig. 2 is a plan of the same, and Fig. 3 is a horizontal section on the line 3 3 of Fig. 1. Fig. 4 is a fragmentary enlargement of the parts shown near the extreme left of Fig. 3.

Referring to the parts by letters, A represents a base which is preferably a circular piece of wood. Extending upward from this base on diametrically opposite sides are U-shaped rods, designated at the bend C and as to their legs C' and $C^2$. The inner legs C' carry the spiders D, which form the shelves for the pies. These spiders are supported the proper distance apart by thimbles E, which surround the rods C' and abut against the spiders. Above the top spider the rods C' project through a top plate B, preferably of wood, which rests on the upper end of the uppermost thimble. This head B supports a name-plate F, which is preferably formed as shown, and has downwardly-extending integral pins $f$, taking into the head B. Lugs $f^2$, formed on this name-plate, take beneath and contact with the arches C, formed by the bends of the U-shaped rods, and thus when the nuts G' and $G^2$, which screw onto the threaded lower ends of the rods C', are tightened up against the lowest thimble and the bottom of the base, respectively, the whole rack is locked together.

The spiders D are formed, as shown, of the cross-bar $d$, which takes around the rods C', as stated, and the arms $d'$, parallel with each other and extending at right angles to the bar $d$. These arms extend higher than the bar $d$, and thus the pie-pan, supported by the spider, rests solely on the upper surface of the arms. As the arms extend in the direction in which the pie-pan is slid off the rack, they will have no tendency to scrape off the dirt from the bottom of the pan, as would be the case with the rod $d$ if it contacted with the pan. At the same time the spider is adapted to support any ordinary size of pie-pan.

Surrounding the rack is a screen H, formed of two semicylindrical pieces of wire-cloth, each bound at its upper and lower edge by the semicircular band $h$ and at its longitudinal edge by the strip $h'$, which is bent around the edge of the screen-cloth, taking onto each side thereof, and then with the encompassed cloth is bent at approximately a right angle, as shown in Fig. 4. This angle-strip $h'$ is thus securely locked to the cloth. The two portions of the screen are secured together by the U-shaped clips J, which take around the projecting ends of the angle-strips $h'$. These projecting ends diverge from each other sufficiently to dovetail, as it were, into the clip, which thus after being either sprung into place or slid on from the end of the strips holds the two parts of the screen securely together.

This construction is not only very simple and efficient in service, but it is very cheap to construct and allows the convenient separation of the case for packing or other purposes.

The casing carries the inside clips K, which are secured to the angle-strips $h'$ and take around the outer leg $C^2$ of the U-shaped rod. These clips guide the casing in its elevation and engage with the rod $C^2$ with sufficient friction either to hold the case in any elevated position or to just allow it to descend. The clips K are formed on but one edge of each half of the screen, and thus in no way interfere with the easy removal of the screen when separated.

In order that the casing may be raised sufficiently high to allow the removal of the highest pie, the U-shaped rods are extended upward above the head B a sufficient distance to properly guide the screen; but this upward extension of the rods also furnishes convenient means for holding the name-plate, as shown, and in no way detracts from the appearance of the rack and case, the name-plate being a very desirable feature to carry the dealer's name or other advertising matter. A finger-clip $h^2$ is secured to each of the lower bands $h$ and furnishes convenient means for raising the screen.

The pie-rack may be conveniently assembled upside down in the following manner: The pins on the name-plate are forced into the head B, and the U-shaped rods are passed through their openings in the head until the arches of the rods engage with the lugs $f^2$ on the name-plate. Thereupon thimbles and inverted spiders are alternately strung on the inner legs $C'$ of the rods until the lowest thimbles are in place, when the nuts $G'$ are screwed up tightly against those thimbles, locking the parts together. The lower ends of the U-shaped rods are then passed through openings in the base A and the nuts $G^2$ screwed onto the rods $C'$. This completes the assemblage of the rack, which may be then righted and the screen secured in place by hooking the clips K about the rods $C^2$ and swinging each half of the screen inward, as on a hinge, about that rod and then either springing the clips J over the projecting ends of the angle-strips $h'$ or sliding those clips on from the ends.

Having described my invention, what I claim is—

1. The combination of a base, two sets of rods rising therefrom, a system of shelves carried by one set of rods, a screen inclosing the shelves and engaging with the other set of rods and adapted to be slid up and down along the same, substantially as described.

2. In a pie rack and case, in combination, a base, rods rising therefrom, a system of shelves carried by said rods, a stationary upper head carried by said rods, an inclosing screen, said screen being adapted to be elevated and to engage more or less snugly with said head when lowered, substantially as described.

3. In a pie rack and case, in combination, a base, vertical rods extending upward therefrom, thimbles surrounding said rods, spiders having eyes which surround the rods between the thimbles, whereby said spiders embrace the rods and are supported by the thimbles and held the proper distance apart and thus constitute shelves, substantially as described.

4. In a pie rack and case, in combination, a base, a pair of rods $C'$ $C^2$ on each side thereof, a system of shelves carried by the inner rods $C'$, a screen surrounding the shelves and engaging with said outer rods $C^2$ which form guides for the elevation of the screen, substantially as described.

5. In a pie rack and case, in combination, a base, a pair of U-shaped rods extending upward therefrom on opposite sides thereof, a system of shelves carried by the inner leg of these rods, a name-plate having lugs which take beneath the bend of the U-shaped rods, a screen surrounding the rack and guided in its elevation by the outer legs of the U-shaped rods, substantially as described.

6. In a pie-rack, in combination, the base, rods $C'$ extending upward therefrom, spiders D taking around said rods, thimbles E between said spiders supporting them and holding them the proper distance apart, a name-plate F held in place between the uppermost thimbles and the upper ends of said rods $C'$, substantially as described.

7. In a pie rack and case, in combination, a suitable base A, a pair of U-shaped rods extending upward from diametrically opposite sides of said base, a system of spiders taking around the inner rods and forming shelves, thimbles surrounding these rods between the spiders and supporting the spiders the proper distance apart, a head B carried by the uppermost spider, a name-plate F carried by said head, said name-plate having lugs $f^2$ which extend beneath the bend of the U-shaped rods and engage therewith, a screen surrounding the rack and engaging with the outer legs of the U-shaped rods, whereby it is guided in its elevation, substantially as described.

8. The combination with vertical guide-rods of an inclosing screen made of longitudinally-separable parts, the longitudinal edges of said parts being flanged outwardly, combined with outside clips which engage said proximate outwardly-flanged edges and clamp the two parts of the screen together, and inside clips which engage said vertical rods and serve to guide the screen in its elevation, substantially as described.

9. A screen composed of a plurality of longitudinally-separable parts, the longitudinal edges of which have strips $h'$ lying on each side of the screen-cloth and with the cloth bent outward whereby the cloth is bound within the strip, said outwardly-bent strips of proximate parts being brought together and diverging outwardly, in combination with U-shaped clips J which engage with the outer sides of said outwardly-extending strips $h'$, said strips dovetailing into said clips whereby the two parts are held tightly but separably together, substantially as described.

10. The combination with a suitable rack, of a pair of vertical rods carried thereby on opposite sides, a pair of semicylindrical screens surrounding said rack and secured at their meeting edges, thus making a cylindrical screen inclosing the rack, clips K formed on one edge of each half of the screen and engaging with said vertical rods and guiding the screen in its elevation, substantially as described.

In testimony whereof I hereunto affix my signature in the presence of two witnesses.

BENTON T. WEBBER.

Witnesses:
ALBERT H. BATES,
PHILIP E. KNOWLTON.